Jan. 28, 1964   W. WILSMANN ETAL   3,119,775
CENTRIFUGAL SEPARATOR CONSTRUCTION FOR
SEPARATING CURDS FROM WHEY
Filed Sept. 9, 1960   2 Sheets-Sheet 1
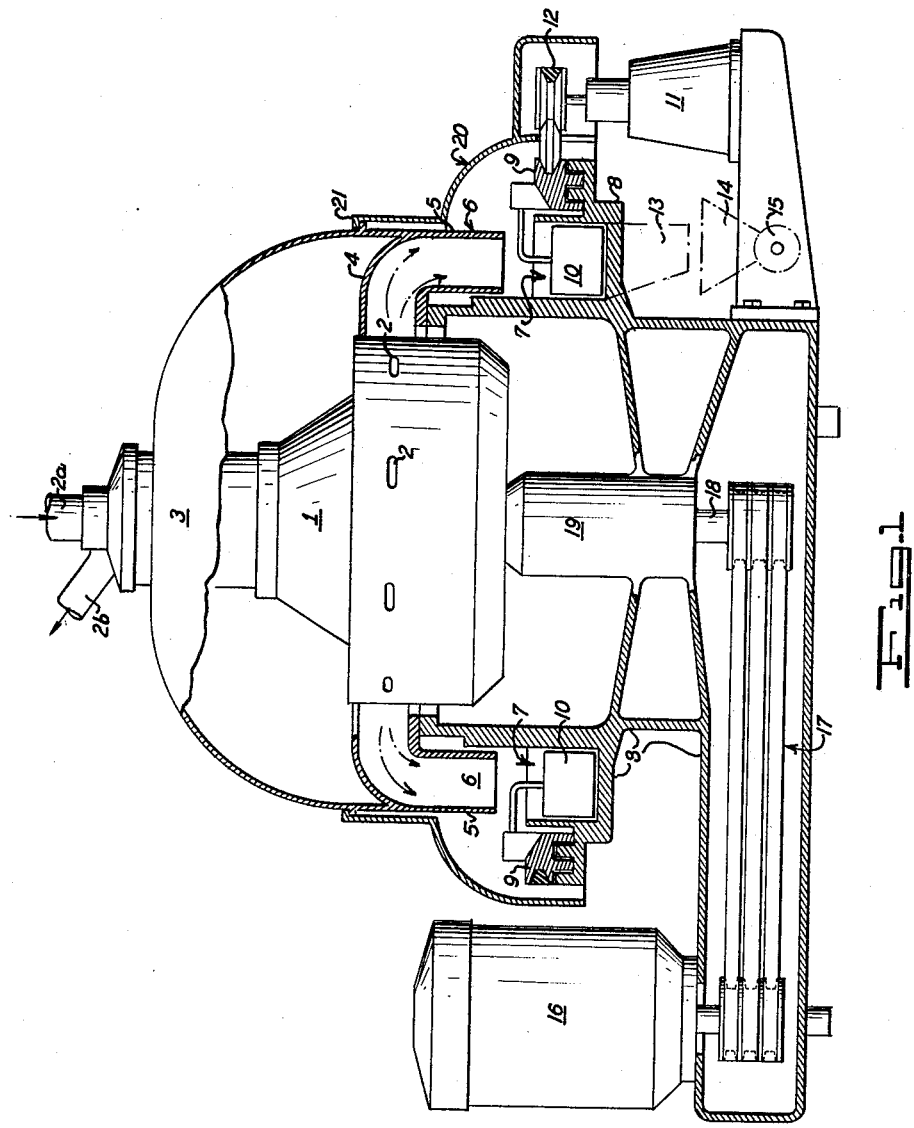
INVENTORS
WILHELM WILSMANN
KARL MEIS
BY
ATTORNEYS

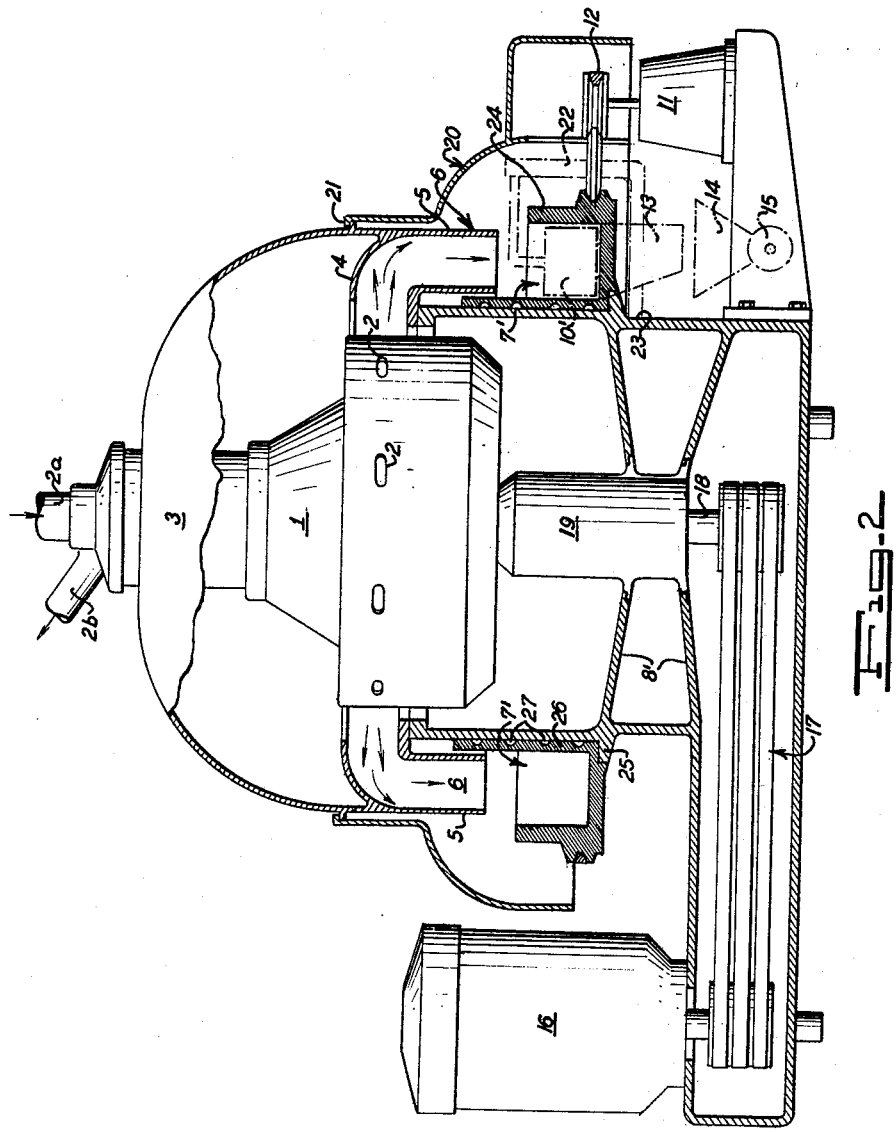

United States Patent Office 3,119,775
Patented Jan. 28, 1964

3,119,775
CENTRIFUGAL SEPARATOR CONSTRUCTION
FOR SEPARATING CURDS FROM WHEY
Wilhelm Wilsmann and Karl Meis, Oelde, Westphalia,
Germany, assignors to Westfalia Separator A.G., Oelde,
Westphalia, Germany, a German corporation
Filed Sept. 9, 1960, Ser. No. 54,969
Claims priority, application Germany Sept. 10, 1959
3 Claims. (Cl. 233—4)

The present invention relates to an apparatus for the collection of solids concentrates, such as solids concentrate, peripherally discharged from a centrifugal drum, either continuously or at stated intervals, and more particularly to such an apparatus wherein solids separated from a carrier liquid during centrifugal operations and peripherally discharged from the drum are deflected, collected, and recovered.

Generally, where materials are treated in a centrifugal drum to separate a sludge portion from a lighter component, the sludge portion or solids fraction passes out of the drum through peripheral discharge openings defined in the drum wall. A collecting chamber is conveniently provided on the centrifuge frame for the reception of the solids fraction discharged from the drum. The collecting chamber is generally annular in form and in one known type of construction the collecting chamber is provided with a tangential outlet. The structural configuration in this instance is similar to the flow-off or discharge outlet found on the pressure side of a rotary or centrifugal pump.

In another type of construction, the solids fraction still containing a certain amount of liquid adhering thereto, are impelled against a curved annular guide plate, such that the discharged solids passing radially outwardly are deflected more or less axially and downwardly. The solids pass along a slanted, converging bottom portion of the collecting chamber provided, for example, as a hopper. At the lower end of the hopper an exit opening is provided so that the solids may pass from the collecting chamber into a suitable container disposed therebelow.

Where highly concentrated solids and solids having a tendency to stick together are concerned, in centrifugal operations, such as, for example, food curds, an efficient discharge is not assured using conventional devices such as those described above. In this connection, the outlet openings often become clogged after a reasonably short period of time and the solids continue to back up more and more toward the rotating drum until finally they occupy the space immediately adjacent the peripheral discharge ports of the drum. It will be appreciated that the high friction heat developed during centrifugal operations causes substantial drying out of the solids concentrate emanating from the drum. This leads to the formation of crustations, such that agglomerates contribute to the clogging of the discharge openings adjacent the drum periphery. Apart from the required interruption of centrifugal operations, not only must the collecting chamber be cleaned but also the drum as well in order to restore the apparatus to the desired, clean condition. This requires dismantling the apparatus and involves an expenditure of time and labor.

It is an object of the present invention to overcome the foregoing drawbacks and to provide an apparatus for the collection of solids concentrate peripherally discharged from a centrifugal drum.

It is another object of the invention to provide such an apparatus which effects the continuous collection and removal of the discharged solids concentrate which is simple and inexpensive in construction and durable and efficient in operation.

Other and further objects of the invention will become apparent from a study of the within specification and accompanying drawing, in which FIGURES 1 and 2 are diagrammatic sectional views of embodiments in accordance with the invention showing their relation to the centrifugal drum, the trough being rotatable and the blades stationary in FIGURE 2 and the trough being stationary and the blades rotatable in FIGURE 1.

In accordance with the present invention an apparatus for the collection of solids concentrate peripherally discharged from a centrifugal drum is provided which includes deflecting means adjacent the drum exterior at the level at which the solids concentrate is peripherally discharged from the drum, and relative movement disposed collecting means adjacent said deflecting means. The relative movement disposed collecting means includes receiving means for receiving solids concentrate discharged from the drum and deflected by said deflecting means as well as removal means for removing the received solids concentrate.

The removal means and the receiving means are positioned for relative movement with respect to each other in order to effect conveying contact between the removal means and the solids concentrate received in the receiving means. The deflecting means surround the drum at the level at which the solids concentrate is peripherally discharged, said deflecting means including conduit means for conducting the solids concentrate to the collecting means.

The receiving means includes trough means for receiving the solids concentrate while the removal means includes blade means disposed for conveying contact with solids concentrate in the receiving means. Conveniently, recovery means are provided adjacent the collecting means, positioned for recovering solids concentrate from the collecting means upon said conveying contact.

More particularly, the deflecting means defines an annular passage with one end adjacent the drum exterior at the level at which the solids concentrate is peripherally discharged and the other end adjacent the collecting means. The conduit preferably takes the form of an elbow bend conduit when seen in radial section so as to downwardly deflect the solid material emanating from the discharge openings of the drum. The receiving means includes an annular trough while the removal means includes blade means disposed for conveying contact with solids concentrate in the trough, the blade means being mounted for movement along a stationary trough or the trough being mounted for movement with respect to a stationary blade means. The trough is suitably provided with an outlet opening. The outlet opening is preferably positioned adjacent the recovery means, especially where the trough is stationary and the blade means rotate, while the recovery means may be positioned adjacent the blade means, especially where the blade means is stationary and the trough moves the solids concentrate thereagainst. Advantageously, the apparatus may be provided with a cover element which may be removed during operation.

In the preferred embodiment a stationary trough formed by a portion of the centrifuge frame is provided as well as a ring element having a plurality of spaced removal blades or paddles connected thereto. The ring element is mounted for rotation at a relatively low number of revolutions, i.e. about 5 r.p.m. and is conveniently driven by any suitable motor means operatively connected, for example, by means of a V-belt drive arrangement. The trough in this instance is suitably provided with an opening in its bottom portion through which the solids conveyed by the rotating blades will pass. Immediately beneath this bottom opening a collecting funnel recovery means may be placed for conveying the collected solids to a conveyor worm, worm pump, or similar device, in the conventional manner.

In accordance with a further embodiment, the trough may be mounted for rotation in the same way while the blade means may be maintained in stationary position. In this regard, the blade means will be preferably scoop-shaped to effect a scraping of the solids from the trough and a removal of the solids by conveyance of the scraped solids along the rotating trough, thence through the trough opening to an adjacent recovery means. In this connection one bottom opening in the trough is provided which will pass over the recovery means at the point where the stationary blade means is situated in order to effect the passage of the solids through the opening and into the collecting funnel.

Referring to FIGURE 1 of the drawing a centrifugal drum 1 is provided along its periphery with spaced discharge outlet openings 2 through which solids separated during centrifugal operations may be passed peripherally outwardly of the drum. The material to be treated enters the drum by means of a feed line 2a, while the liquid fraction separated from the solids concentrate passes out of the drum, such as by means of a flow line 2b. The drum is suitably provided with a protective hood 3 in the known manner.

Disposed around the circumference of the drum 1 at the level of the peripheral discharge openings 2 an annular conduit or deflecting chamber 6 is provided having an upper curved guide plate 4 attached to hood 3 which downwardly extends to form outside wall 5 of deflecting chambers 6. As seen in FIGURE 1 of the drawing, the guide plate 4 and wall 5 together form a downwardly curved deflector having a cross-section which defines a substantially uniform 90° arc. Thus, solids passing out through discharge openings 2 will be impelled against curved guide plate 4 and deflected downwardly through chamber 6 along outside wall 5. Outside wall 5 downwardly extends in a substantially vertical manner in order to avoid, for the most part, any sticking together of the solids or adhering of the same to the walls of chamber 6. An annular trough 7 defined by an extension of the centrifugal frame 8 is disposed directly below chamber conduit 6 so as to conveniently receive the solids being downwardly deflected. A ring element 9 is rotatably seated on frame 8, said ring element 9 being equipped with removal blades 10 spaced along the circumference thereof. Blades 10 are suitably disposed for conveying contact with solids concentrate received in trough 7.

Accordingly, motor 11 is provided for driving ring element 9. Motor 11 is operatively connected for rotation of ring element 9 by means of V-belt 12. Outlet opening or guide channel 13, shown in phantom, is provided in the bottom portion of trough 7 so as to effect the discharge of the solids received in trough 7 upon the conveying contact therewith by rotating blades 10. Immediately below outlet 13, a collecting funnel 14 and a conveyor worm 15, both shown in phantom, are provided for the recovery of the solids passing from outlet 13. Conveyor worm 15 may assume any conventional construction and the same may be replaced by any similar device.

In this connection, it will be appreciated that several outlets 13 and corresponding collecting funnels 14 may be provided along the circumference of trough 7 if desired, in order to effect a convenient removal and collection of solids at various points along the trough.

Motor 16 is disposed on frame 8 which is operatively connected for driving shaft 18, which, in turn causes the rotation of the centrifugal drum 1. A triple V-belt 17 is positioned between the shaft of motor 16 and the driving shaft 18 to attain the desired power linkage. Shaft 18 is suitably journaled in bearing 19 so as to conveniently drive centrifugal drum 1.

An additional feature in accordance with the instant construction is the provision for a removable hood 20 disposed in covering relation over the various parts of the collecting and removing apparatus. Hood 20 is suitably positioned against flange 21 provided on hood 3 such that hood 20 may be removed during the centrifuging operation to permit inspection at any time.

Referring to FIGURE 2, a similar centrifugal drum arrangement to that of FIGURE 1 is shown wherein like parts are correspondingly numbered. In this embodiment, however, the trough 7' is mounted for rotation on frame 8' while the blade 10' is stationary. Trough 7' is provided with an inner flange extension 26 which slidably passes along the corresponding cylindrical surface of frame 8'. Frame 8' includes a flange seat 25 upon which trough 7' is slidably seated during rotation. The belt 12 engages a corresponding groove formed in the periphery of trough 7' whereby trough 7' is suitably rotated about frame 8'.

Blade 10', on the other hand, is fixedly connected to support arm 22 which is mounted on frame 8' at 23.

Therefore, trough 7' is provided with a modified U-shaped cross section having an outer axial flange 24 and an inner flange 26 intermediately connected at their bottom portions. Inner flange 26 is suitably provided with annular grooves 27 so as to reduce the frictional contact with the corresponding cylindrical portion of frame 8'. The rotatable trough 7' is also provided with an outlet opening or guide channel 13 (shown in phantom). In this instance, the collecting funnel 14 and the conveyor worm 15 (both shown in phantom) are situated immediately below stationary blade 10' so that during rotation of trough 7', when outlet opening 13 passes blade 10', the solids will be held back in the trough and allowed to fall through the outlet opening to the collecting funnel 14.

It will be appreciated, of course, that a plurality of stationary blades 10' and corresponding outlet openings 13 may be provided. In this connection, a corresponding number of collecting funnels 14 would be required, the same being positioned immediately below the blades 10'. By spacing the blades 10', the outlet openings 13 and the collecting funnels 14 equidistantly about the circumference of trough 7', a more efficient recovery of solids may be effected. Naturally, where trough 7 is stationary and a plurality of blades 10 are used which are rotatable on the ring element 9, a multiple number of outlet openings 13 and corresponding collecting funnels 14 may be used. In the same way, the rotating blades 10 would force the solids to the outlet openings 13 so that the solids would fall therethrough into the corresponding collecting funnels 14.

In accordance with the foregoing, an advantageous construction is provided wherein, for example, the centrifuging of the curd from the whey, as is desired in the dairy industry, may be conveniently carried out. The milk solids in this regard, in thick or heavy skim milk may be centrifugally treated in the disclosed apparatus wherein the solid material content thereof may be recovered. Generally, such materials contain a milk solids content of from 20 to 22% on a dry basis. The rotation of the blades or trough may be suitably carried out at a comparatively low rate which may amount to about 5 revolutions per minute.

We claim:

1. In a centrifugal separator for separating curds from whey having a centrifugal drum with peripheral discharge nozzle outlets for the curds, the improvement which comprises a stationary annular deflector surrounding the drum exterior at the level of said nozzle outlets, said deflector being downwardly curved so that its cross-section defines a substantially uniform 90° arc, the lower portion of said deflector defining an annular downwardly directed vertical discharge outlet, an annular collecting trough positioned below said discharge outlet and in spaced relationship thereto, blade means positioned in said trough for conveying contact with curds deposited therein, said collecting trough and said blade means being positioned for relative rotational movement with respect to each other to effect conveying contact between said blade means and curds in said trough, and recovery means positioned for recovering curds from said collecting trough upon said conveying contact.

2. Improvement according to claim 1 in which said blade means are positioned to rotate within said collecting trough and in which said trough has at least one discharge opening through the bottom thereof.

3. Improvement according to claim 1 in which said collecting trough is a rotating trough and in which said blade means is a stationary blade means, said trough having at least one discharge opening through the bottom thereof.

References Cited in the file of this patent

UNITED STATES PATENTS

| | | |
|---|---|---|
| 581,208 | Hewitt | Apr. 20, 1897 |
| 998,949 | Berrigan | July 25, 1911 |
| 1,703,742 | List | Feb. 26, 1929 |
| 2,387,276 | Link | Oct. 23, 1945 |
| 2,432,829 | Strezynski | Dec. 16, 1947 |
| 2,436,498 | Strezynski | Feb. 24, 1948 |
| 2,453,924 | McFadden | Nov. 16, 1948 |
| 2,628,021 | Staaff | Feb. 10, 1953 |
| 2,668,658 | Peltzer | Feb. 9, 1954 |
| 2,710,718 | Denman | June 14, 1955 |